Patented June 20, 1933

1,914,785

UNITED STATES PATENT OFFICE

HORACE FINNINGLEY OXLEY, OF SPONDON, NEAR DERBY, ENGLAND, ASSIGNOR TO CELANESE CORPORATION OF AMERICA, A CORPORATION OF DELAWARE

PRODUCTION OF OXYGENATED ORGANIC COMPOUNDS

No Drawing. Application filed February 7, 1929, Serial No. 338,338, and in Great Britain February 22, 1928.

This invention relates to the manufacture of acetic acid and other carboxylic acids, by processes of the kind in which methyl alcohol or other alcohol in the free or combined state is catalytically combined with carbon monoxide.

A process of producing acetic acid from methyl alcohol and carbon monoxide in the presence of an acid catalyst containing a radicle of an oxy acid of a non-metallic element, such as, for instance, phosphoric acid, or other acid derived from an oxide of phosphorus is described in U. S. application Serial No. 138,116 filed 29th September, 1926 now Patent No. 1,864,643. In this process a gaseous mixture containing methyl alcohol and carbon monoxide is passed preferably under pressure over or through a catalytic mass consisting of or comprising a phosphoric acid at elevated temperatures, preferably between 300 and 400° C. The acetic acid may be obtained either in the free state and/or in the form of its methyl ester, the proportion of free acetic acid depending inter alia on the proportion of water vapour present in the reaction mixture, and on the relative proportion of the methyl alcohol and carbon monoxide. The phosphoric acid may be employed either in the form of the ortho-, pyro- or meta-phosphoric acid, or any mixture of these acids. The particular form of phosphoric acid or the particular mixture of phosphoric acids actually present during the reaction, depends upon the conditions under which the reaction is conducted. Instead of methyl alcohol, compounds capable of decomposing with the formation of methyl alcohol under the conditions of the reaction may be employed, either alone or in admixture with methyl alcohol; thus, for instance, dimethyl ether or a methyl ester such as methyl formate or methyl acetate may be employed. When methyl formate is used in this way, isomerization takes place, the methyl formate being transformed into acetic acid. As indicated in said application, the process is also applicable to the synthetic production of higher fatty acids or their esters from higher primary aliphatic alcohols.

As indicated in the specification referred to, the apparatus employed should be proof against corrosion by acids and by carbon monoxide. For instance, the parts in contact with acetic acid may be made of or lined with copper, while those containing phosphoric acid or in contact therewith may have a lining of graphite, gold, or platinum, or be made of or lined with copper.

It has now been discovered that in the manufacture of acetic acid by the methods forming the subject matter of U. S. application Serial No. 138,116 filed 29th September, 1926, when using reaction vessels which consist of or are lined with gold, platinum, or other metal or material which resists the action of the phosphoric acid or other inorganic acid catalyst employed, the yield of acetic acid can be increased by an addition of a suitable substance to the phosphoric acid or other inorganic acid catalyst employed.

The substance used for this purpose may consist of copper phosphate or other salt or compound of copper. When copper phosphate is employed, it may be formed in the catalytic mixture by the addition thereto of metallic copper or of any copper salt, whether cupric or cuprous, which is capable of being acted upon by the phophoric acid to form copper phosphate. When a cupric salt, for instance, copper formate, is added, it appears to be reduced under the conditions of the reaction to a cuprous salt.

Instead of a copper salt, platinum or palladium or other metal or metallic compound capable of acting as a carrier for carbon monoxide under the conditions of the reaction may be employed in admixture with the phosphoric acid or other inorganic acid catalyst.

The substance employed as an addition to the phosphoric acid or other inorganic acid catalyst appears to exert a very powerful influence on the course of the reaction, and may be regarded as a "promoter", and all such promoters are hereinafter included in the term metallic promoter capable of acting as a carrier for carbon monoxide. Very small proportions of cuprous phosphate, for instance, are capable of modifying the reaction so as to effect substantially complete conversion of the methyl alcohol into acetic acid. For instance, the presence of 0.1 or 0.2% of copper in the phosphoric acid appears to be sufficient to reduce the loss of methyl alcohol to a minimum; and a substantial increase in the amount of copper present, for instance to amounts in excess of 1% does not appear to present any advantage over the use of smaller amounts.

The apparatus, conditions and general procedure adopted in carrying the invention into effect may be similar to those described in U. S. application Serial No. 138,116, filed 29th September, 1926. Thus, temperatures preferably between 250° and 400° C. and pressures up to 300 atmospheres or more may be employed. Also, the phosphoric acid or other inorganic acid catalyst may be used in a liquid state or distributed over or supported on an inert solid carrier.

The following examples will serve to illustrate the manner in which the invention can be performed. Many variations can be introduced, and the invention is not limited in this respect.

Example 1

A gold-lined vessel was charged with pyrophosphoric acid containing about 0.2–0.5% of metallic copper. A mixture of methyl alcohol vapour, water vapour, and carbon monoxide prepared by passing carbon monoxide over or through methyl alcohol heated to a temperature of about 50–55° C., and afterwards over or through water heated to a temperature of about 80° C. was passed under a pressure of about 100–160 atmospheres through the catalytic mass, which was maintained at a temperature between about 285° and 315° C. The products of reaction were separated by condensation, a condensate containing acetic acid and methyl acetate being obtained. The methyl acetate may be converted into free acetic acid and dimethyl ether or methyl alcohol by saponification.

Example 2

A catalytic mass prepared by adding to the pyro-phosphoric acid about 0.5–1% of copper formate was employed, the conditions being otherwise the same as in Example 1. A mixture of acetic acid and methyl acetate was obtained as product.

Example 3

A mixture of methyl alcohol vapour and carbon monoxide was prepared by passing carbon monoxide through methyl alcohol heated to about 50–55° C., and was passed into contact with a catalytic mass in the manner described in Example 1. A product containing methyl acetate and acetic acid was obtained.

The invention is applicable broadly to any of the forms of the process for the synthetic production of carboxylic acids which are described in U. S. application Serial No. 138,116 filed 29th September, 1926. For example, the methyl alcohol may be replaced wholly or in part by di-methyl ether or methyl esters or other compounds capable of decomposing with the separation of a methoxy group or methyl alcohol under the conditions of the reaction. The process may also be employed for the production of acetic acid by the isomerization of methyl formate. Likewise, the carbon monoxide may be used in the form of a mixture with other gases which do not interfere to a material extent with the progress of the reaction.

The phosphoric acids may also be used in the form of the ortho-, meta-, or pyro-phosphoric acid, or a mixture of these, or in the form of their acid salts, as indicated in the specification before mentioned, and may be replaced by aromatic sulphonic acids or other inorganic acid catalysts of the character therein indicated.

The process is preferably conducted under pressure and at elevated temperatures.

The use of a "promoter" as herein described is also of advantage in the synthetic production of other carboxylic acids from alcohols whether in the free or combined form and carbon monoxide by the process described in U. S. application Serial No. 138,116, filed 29th September, 1926.

What I claim and desire to secure by Letters Patent is:—

1. Process for the manufacture of compounds containing an alkacyl group which comprises subjecting an aliphatic alcohol of the formula $C_nH_{(2n+1)}OH$ to the action of carbon monoxide in presence of an inorganic acidic catalyst containing at least one acidic hydroxyl group directly linked to a non-metallic element, characterized in that the reaction is performed in presence of a metallic promoter capable of acting as a carrier for carbon monoxide.

2. Process according to claim 1, characterized in that the reaction is performed in presence of water vapour.

3. Process for the manufacture of compounds containing the acetyl group which comprises subjecting methyl alcohol to the action of carbon monoxide in presence of an inorganic acidic catalyst containing at least one acidic hydroxyl group directly linked to a non-metallic element, characterized in that the reaction is performed in presence of a metallic promoter capable of acting as a carrier for the carbon monoxide.

4. Process according to claim 3, characterized in that the reaction is performed in presence of water vapour.

5. Process for the manufacture of compounds containing an alkacyl group which comprises subjecting an aliphatic alcohol of the formula $C_nH_{(2n+1)}OH$ to the action of carbon monoxide in presence of an inorganic acidic catalyst containing at least one acidic hydroxyl group directly linked to a non-metallic element, characterized in that the reaction is performed in presence of a metal compound capable of acting as a carrier for carbon monoxide.

6. Process for the manufacture of compounds containing an alkacyl group which comprises subjecting an aliphatic alcohol of the formula $C_nH_{(2n+1)}OH$ to the action of carbon monoxide in presence of an inorganic acidic catalyst containing at least one acidic hydroxyl group directly linked to a non-metallic element, characterized in that the reaction is performed in presence of a salt of copper.

7. Process for the manufacture of compounds containing an alkacyl group which comprises subjecting an aliphatic alcohol of the formula $C_nH_{(2n+1)}OH$ to the action of carbon monoxide in presence of an inorganic acidic catalyst containing at least one acidic hydroxyl group directly linked to a non-metallic element, characterized in that the reaction is performed in presence of a cuprous salt of a phosphoric acid.

8. Process for the manufacture of compounds containing an alkacyl group which comprises subjecting an aliphatic alcohol of the formula $C_nH_{(2n+1)}OH$ to the action of carbon monoxide in presence of a phosphoric acid, characterized in that the reaction is performed in presence of a metallic promoter capable of acting as a carrier for carbon monoxide.

9. Process for the manufacture of compounds containing an alkacyl group which comprises subjecting an aliphatic alcohol of the formula $C_nH_{(2n+1)}OH$ to the action of carbon monoxide in presence of a phosphoric acid, characterized in that the reaction is performed in presence of a metal compound capable of acting as a carrier for carbon monoxide.

10. Process for the manufacture of compounds containing the acetyl group which comprises subjecting methyl alcohol to the action of carbon monoxide in presence of an inorganic acidic catalyst containing at least one acidic hydroxyl group directly linked to a non-metallic element, characterized in that the reaction is performed in presence of a metal compound capable of acting as a carrier for carbon monoxide.

11. Process for the manufacture of compounds containing the acetyl group which comprises subjecting methyl alcohol to the action of carbon monoxide in presence of an inorganic acidic catalyst containing at least one acidic hydroxyl group directly linked to a non-metallic element, characterized in that the reaction is performed in presence of a salt of copper.

12. Process for the manufacture of compounds containing the acetyl group which comprises subjecting methyl alcohol to the action of carbon monoxide in presence of a phosphoric acid, characterized in that the reaction is performed in presence of a metal compound capable of acting as a carrier for carbon monoxide.

13. Process for the manufacture of compounds containing the acetyl group which comprises subjecting methyl alcohol to the action of carbon monoxide in presence of a phosphoric acid, characterized in that the reaction is performed in the presence of a salt of copper.

14. Process for the manufacture of compounds containing the acetyl group which comprises subjecting methyl alcohol to the action of carbon monoxide in presence of a phosphoric acid, characterized in that the reaction is performed in presence of a cuprous salt of a phosphoric acid.

In testimony whereof I have hereunto subscribed my name.

HORACE FINNINGLEY OXLEY.